United States Patent
Henning

[15] 3,648,335
[45] Mar. 14, 1972

[54] HOSE CLIP

[72] Inventor: Wolfgang Henning, 3538 Niedermarsberg, Dutlingstal, Germany

[22] Filed: June 22, 1970

[21] Appl. No.: 48,117

[30] Foreign Application Priority Data

June 28, 1969   Germany .....................P 19 33 714.5

[52] U.S. Cl. ...............................24/279, 85/32 V
[51] Int. Cl........................................B65d 63/06
[58] Field of Search ..............................24/279; 85/32 V, 36

[56] References Cited

UNITED STATES PATENTS

| | | | |
|---|---|---|---|
| 2,140,064 | 12/1938 | Tinnerman | 85/36 |
| 2,383,133 | 8/1945 | Kost | 85/32 V |
| 3,362,278 | 1/1968 | Munse | 85/32 V |
| 1,479,317 | 1/1924 | Peirce | 24/275 |

FOREIGN PATENTS OR APPLICATIONS

| | | | |
|---|---|---|---|
| 572,655 | 10/1945 | Great Britain | 85/36 |
| 538,540 | 8/1941 | Great Britain | 85/36 |

Primary Examiner—Donald A. Griffin
Attorney—Karl F. Ross

[57] ABSTRACT

A hose clip of sheet metal is formed as a part-circular element with two end flanges interconnected by a clamping screw. The clamping screw is also of sheet metal and has a head which abuts one of the flanges. The other flange is formed of two portions folded together so as to be face-to-face but spaced apart. Each portion of this other flange has an aperture in threaded engagement with the screw member. Side flaps of each portion are bent towards the opposite portion to abuttingly engage the latter portion and maintain the spacing between the two portions.

3 Claims, 3 Drawing Figures

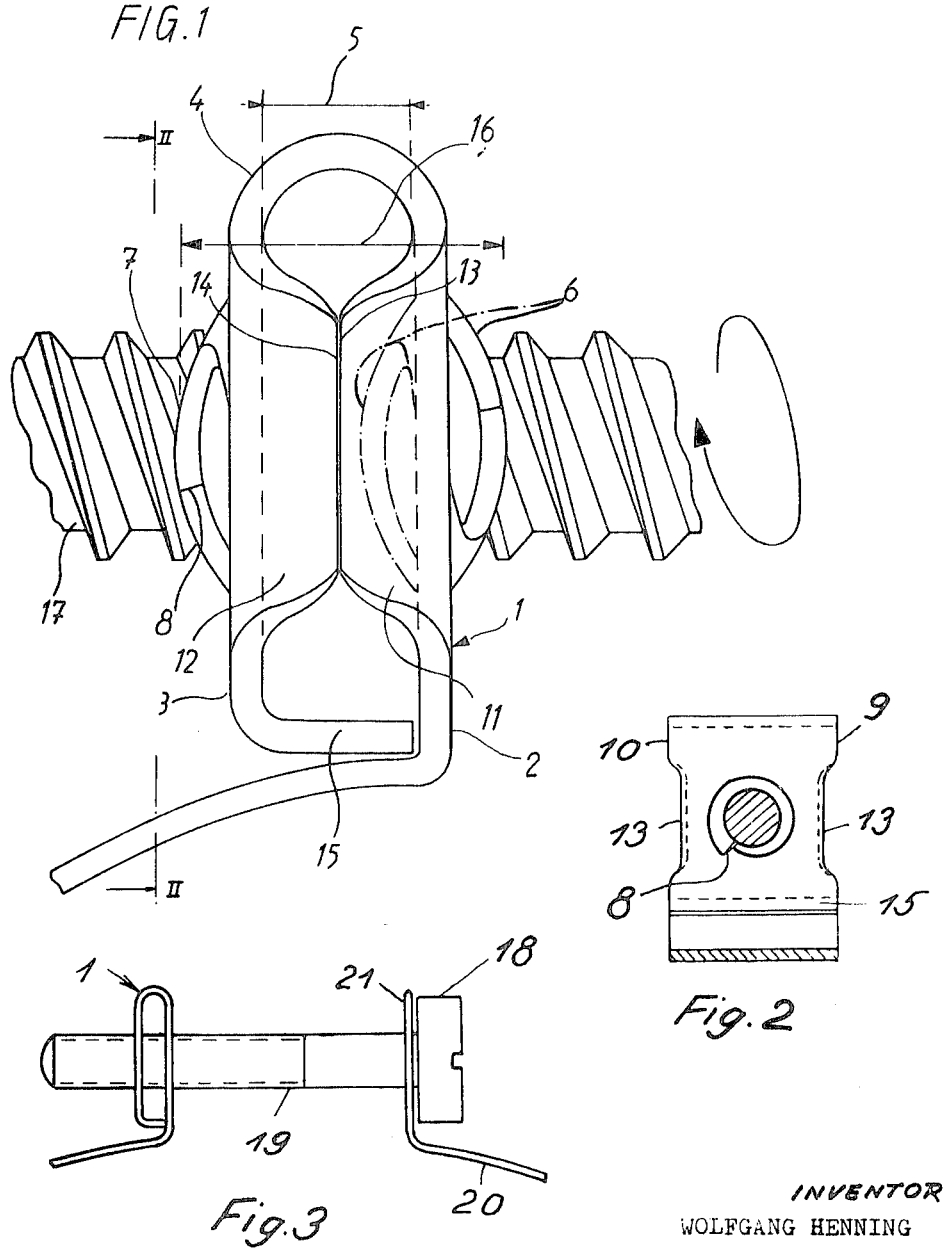

HOSE CLIP

My present invention relates to a hose clip provided with a clamping screw.

Hose clips of the type in question have become known wherein at least at one end of the clip a bent flange surrounds an insert provided with a screw thread for engaging the clamping screw.

In these known hose clips it has been necessary to take certain steps to ensure that the insert at the end of the clip is retained in position before receiving the screw. Also, the last operation required before the clip is ready for delivery has been to ensure that the geometrical centerline of the clamping bolt exactly coincides with the axis of the threaded hole of the insert so that the bolt can be screwed in without jamming and thus without damaging the thread. These conditions dictate that the clamping bolt be screwed in by hand, in particular because of the flexibility of the hose clip, so that fully automatic production and preassembly up to a state ready for delivery was difficult to realize. In some prior instances the ends of the clip were rolled without use of an insert and made with throughgoing bores, designed to receive a clamping screw with a hardened surface, in particular a self-tapping screw.

This arrangement of a clip has the grave disadvantage that a costly, hardened clamping screw is required. Also, there are difficulties with the threading-in of the screw because the rolled ends of the clip deform in the range of the rolled part, especially during dismantling with subsequent reassembly, so that the bores are no longer in line.

According to the invention there is provided a hose clip having outwardly bent flanges at the clip ends, with a part of one of the flanges bent over again by 180° to form a flat loop with parallel sides, and a clamping screw (advantageously a sheet-metal screw) with a head and with a threaded shank fitting into two aligned bores in the generally radially extending major loop portions which act as spring nuts integral with the clip strip which is made of ordinary unhardened material(;) those two edges of the parallel loop portion are bent along their lateral edges into confronting lugs which are mutually in contact so as to maintain the shape of the loop.

A preferred hose clip in accordance with the invention has the advantage that it consists of only two components, i.e., a strip and the clamping screw. It has the further advantage that it is particularly suitable for fully automatic production right up to the delivery stage, on account of the fact that the screw can be readily driven by an automatic tool during the last operation before the assembly is ready for delivery, since the shank of a sheet-metal screw threads itself without difficulty into the two bores or apertures in the resiliently deformable bent over parts defining the major portions of the loop. The two-part clip, requires only a minimum of material and produces only a minimum of scrap, so that it can be economically made also of noncorroding, comparatively expensive special-purpose steel.

Further features of the invention will be described hereinafter with reference to the accompanying drawing in which FIG. 1 shows a fragmentary view of a clip in accordance with the invention including a coupling flange and part of a clamping screw;

FIG. 2 is a cross-sectional view taken on the line II—II of FIG. 1, drawn to a smaller scale; and FIG. 3 is a fragmentary view of the clip showing the entire clamping screw.

The hose clip shown in the drawing has an extremity 20 abutting the head 18 of a clamping screw 19. The end 20 terminates in a coupling flange 21 provided with a bore facilitating the insertion of the screw shank 17, the diameter of the bore being greater than the external diameter of the shank.

At the other end 1 of the clip, a flat loop is formed from two flange parts 2 and 3 interconnected at their radially outer ends by a curved section 4, parallel to flange 18 and separated from each other by a distance 5. Each of the two generally radial flange parts 2, 3 has a tapping 6, 7 in the form of a spring nut formed by piercing and shaping under pressure, a notch 8 being made at one point as shown in FIG. 2.

The distance 5 between the two flanges is correlated with the pitch of the screw thread, taking into account the raising of the material during the pressing-in of the formed thread, so that one thread flank of the screw carries the load against each of the two major loop portions 2 and 3 when in contact with these flanges. This load-carrying engagement is ensured during the tightening of the screw even when comparatively high tensile forces are involved since ears or lugs 11 and 12 are formed at opposite side edges 9 and 10 of parts 2, 3 with the facing edges 13 and 14 of these lugs adjoining each other. This ensures that the two parts 2 and 3 rest against each other and provides load-carrying contact of the two spring nuts with the corresponding thread flanks of the screw.

Also, the outer end of the outer flange part 3 is again bent at a right angle to form a brace 15 resting against the inside of the inner flange part 2 and supplementing the load-carrying action of the two lugs 11 and 12.

The spacing 5 of the two lug portions 2 and 3 has also the advantage of reinforcing the end of the clip against undesirable deflection during the tightening of the clamping screw. In the production of spring nuts by piercing, embossing and cutting, care must be taken to ensure that the hole diameter corresponds to the core diameter of the screw 19 so that automatically a self-locking action is obtained when the screw has been tightened, no matter how far it has been driven in.

The two spring nuts integral with the two parts 2 and 3 can be made with a prong thread. The clip can be made of a comparatively thin material, left unhardened, and can be used in conjunction with an unhardened sheet-screw, both parts being made by forming, a method particularly suitable for fully automatic production and fully automatic preassembly up to the delivery stage.

With production of the clip end 1 as described above, this end is a very stiff cage ensuring not only a high load-carrying capacity of the screw threads but also a high resistance to buckling.

The two tapped formation 6 and 7 can be arranged so that their raised surfaces are on the outside, as shown drawn in full lines in FIG. 1. This arrangement has the advantage that the shank 17 of the screw is supported over a greater length 16.

However, the formations 6 and 7 can be pressed into the two parts 2 and 3 so that their the raised surfaces converge as shown in phantom lines in FIG. 1, for the formation 6. This arrangement in which the inverted formation 6 cooperates with the outwardly bulging formation 7 shown in full lines, has the advantage that tearing or even stripping of the thread is largely avoided because the raised parts tent to close against the screw core as the shank 19 is driven.

This last arrangement is particularly suitable for the automation of preliminary assembly, especially as regards the automatic screwing-in of a sheet-metal screw because the screw tip automatically centers itself by virtue of the funnel effect.

In the production of spring nuts in the two loop portions 2 and 3, the notches 8 are most conveniently made at the bottom, as shown in FIG. 2, or at the top, offset from the two lateral edges 9 and 10. This is so because there is only very little material available near these edges, in view of the requirement of making the clip as narrow as possible, so that with a different positioning of the notches 8 the clip would be excessively weakened.

I claim:

1. In a hose clip comprising a part-circular element adapted to fit around a hose, said element terminating in two confronting flanges with aligned apertures, and a screw member traversing said apertures in abutting relationship with one of said flanges and in threaded engagement with the other of said flanges for drawing said flanges together to tighten said element around the hose, the improvement wherein said other of said flanges is bent into a flat loop with generally radially extending major portions parallel to each other and to said one of said flanges, said major portions being provided with tapped formations resiliently engaged by said screw member and being integrally interconnected at their radially outer ends by a curved flange section, each of said major portions being further provided along opposite lateral edges thereof with a pair of lugs extending toward corresponding lugs of the other major portion, said pairs of lugs abutting each other under stress from said screw member for maintaining said major portions spaced apart by a predetermined distance.

2. The improvement defined in claim 1 wherein one of said major portions has a free radially inner end bent back to the other major portion.

3. The improvement defined in claim 1 wherein said tapped formations bulge out from said major portions.

* * * * *